United States Patent [19]

Davis

[11] 4,072,611
[45] Feb. 7, 1978

[54] BELT DEWRINKLING AND ALIGNMENT METHOD AND APPARATUS

[75] Inventor: Steven S. Davis, Bountiful, Utah

[73] Assignee: Envirotech Corporation, Menlo Park, Calif.

[21] Appl. No.: 763,949

[22] Filed: Jan. 31, 1977

[51] Int. Cl.² ............................................. B01D 33/02
[52] U.S. Cl. ..................................... 210/143; 210/400; 210/DIG. 3
[58] Field of Search ................. 198/806, 836; 210/143, 210/400, 401, DIG. 3; 226/21

[56] References Cited

U.S. PATENT DOCUMENTS

| 2,071,682 | 2/1937 | Buccicone | 210/DIG. 3 |
| 2,842,361 | 7/1958 | Miller | 226/21 |
| 3,664,561 | 5/1972 | Feiertag | 226/21 |
| 3,760,945 | 9/1973 | Davis | 210/143 |

FOREIGN PATENT DOCUMENTS

| 2,032,626 | 3/1971 | Germany | 226/21 |
| 2,254,372 | 5/1974 | Germany | 226/21 |

Primary Examiner—John Adee
Assistant Examiner—Robert H. Spitzer
Attorney, Agent, or Firm—Robert E. Krebs; William S. Bernheim

[57] ABSTRACT

In combination with a filtration machine of the type employing an endless belt of filter medium without beads on either of its edges, a pair of devices for aligning and dewrinkling the belt. Each of the aligning and dewrinkling devices includes a rigidly-mounted arm and a first cylindrical roller extending from the arm beneath the adjacent edge of the belt of filter medium. Also, each of the aligning and dewrinkling devices includes a second arm pivotably connected to the first arm and a second cylindrical roller extending from the second arm above the adjacent edge of the belt of filter medium so that a long nip line is defined between the rollers. A spring is connected between the ends of the two arms to urge the pivoted arm to rock to pinch the rollers together along the nip line to grip the filter belt. Also, a selectively-actuatable ram assembly is connected between the arms for selectively increasing the grip of the rollers on the belt.

11 Claims, 4 Drawing Figures

BELT DEWRINKLING AND ALIGNMENT METHOD AND APPARATUS

BACKGROUND OF THE INVENTION

1. Field of the Invention

The present invention relates to improved means for continuous filtration and, more particularly, to improvements in continuous filtering devices of the type employing endless belts of filter medium.

2. State of the Art

Filtration machines which employ endless belts of thin filter medium trained to travel over a drainage surface are well known for separating solids from liquids or slurries. One example of such a filtration machine is a rotary drum vacuum-type filter; another example is a pressure filter type of machine such as taught in my U.S. Pat. No. 3,760,945. In such filtration machines, it is requisite that the edges of the filter medium belt be kept parallel and aligned with the edges of the drainage surface to prevent vacuum from being lost and/or to prevent solids from entering the filtrate system. Another way of stating this requirement is that the filter medium belt must, within limits, be kept centered during its travel across the drainage surface. It is also requisite that the belt of filter medium be kept stretched laterally across the drainage surface; if this requirement is not met, wrinkles can develop in the belt which will interfere with the filtration operation as mentioned above and with the discharge of filtered solids from the belt.

Various devices have been proposed and utilized for aligning an endless belt of thin filter medium trained to travel across a drainage surface. Generally speaking, such devices have adequately accomplished the function of keeping the edges of a filter belt in parallel alignment, but have failed to satisfactorily prevent wrinkles from developing across the belt. As a rule, such prior devices have operated by slidably gripping beads which are sewn or otherwise affixed along the opposite edges of a filter belt; the beads function like a track which is moved and guided by the aligning devices. The beads add to the initial cost of the filter belts and also to maintenance costs because the beads wear due to the bearing pressure of the guide devices.

A primary object of the present invention is to provide, in combination with a filtering machine having an endless belt of thin filter medium trained to travel across a drainage surface to which vacuum or pressure is applied to separate liquid from solids or slurry carried by the belt, improved means for guiding and dewrinkling the belt of filter medium as the same travels over a drainage surface. A specific advantage of the device of the present invention is that it aligns and dewrinkles an endless traveling belt of thin filter medium without the belt being provided with a bead on either of its edges. The term "filtration machine" as utilized herein refers to devices for mechanically separating solids from liquids or slurries and includes the aforementioned vacuum and pressure type filters as well as pulp washers and the like which employ traveling webs of filter medium.

Further objects and advantages of the present invention may be readily ascertained by reference to the following detailed description and appended drawings, which are offered by way of example only and not in limitation of the invention, the scope of which is defined by the appended claims and equivalents.

DETAILED DESCRIPTION OF THE PREFERRED EMBODIMENT

Figure 1:
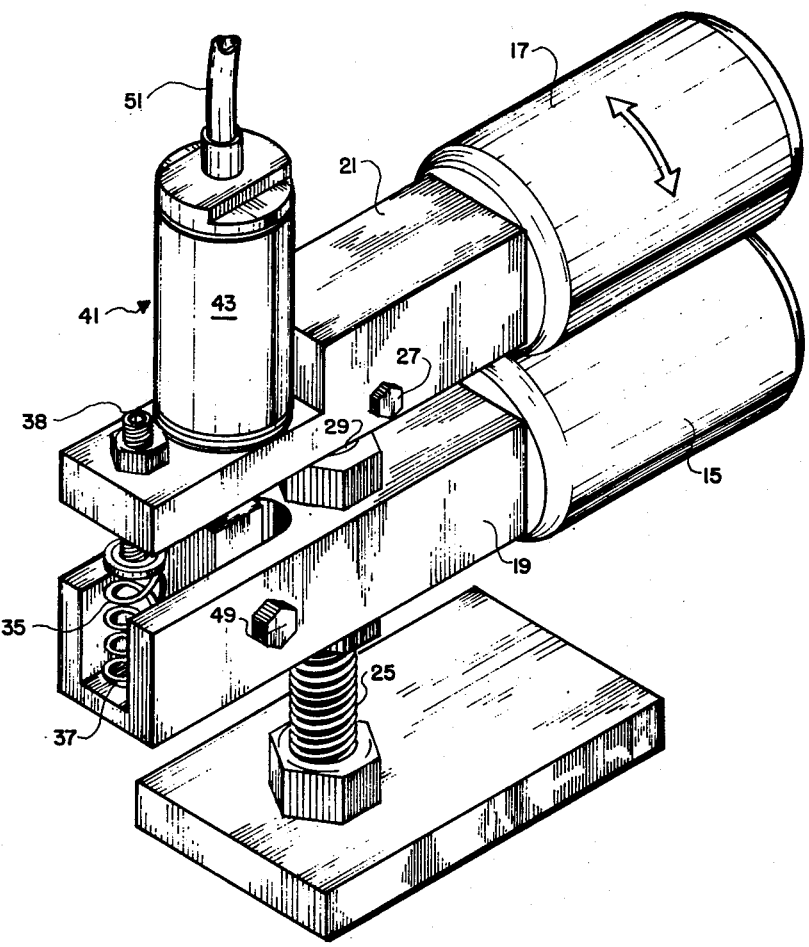
FIG. 1 is a pictorial view of a device according to the present invention.
Figure 2:
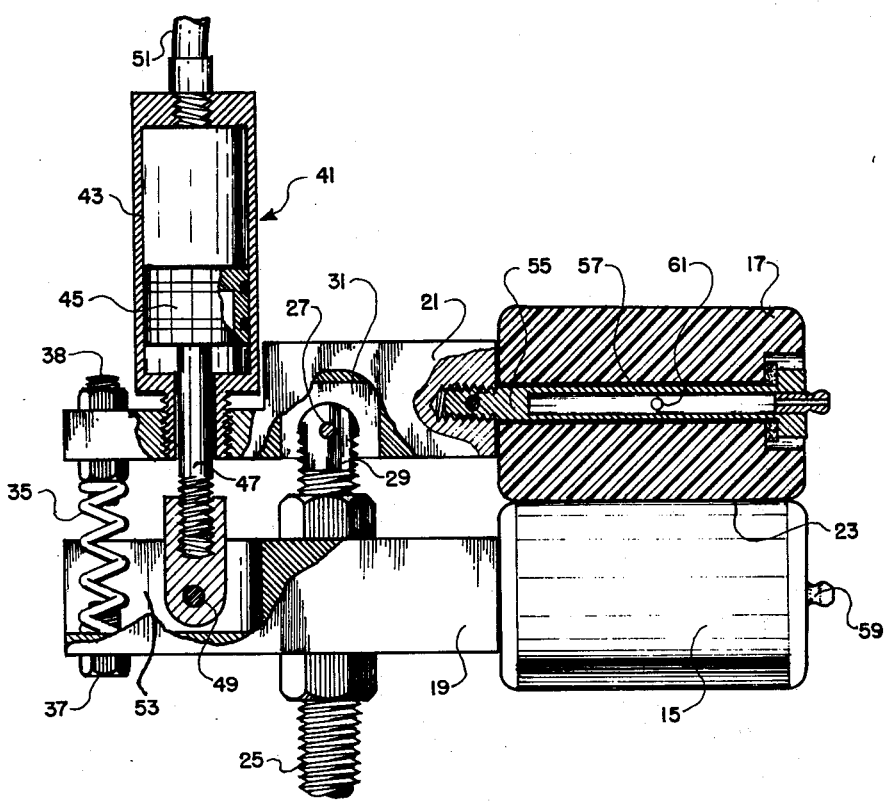
FIG. 2 is a side view of the device of FIG. 1 with portions thereof cut away for purposes of illustration.

In accordance with the present invention, there is provided a pair of devices for aligning and dewrinkling an endless belt of thin filter medium trained to travel across a drainage surface of a filtration machine where the belt of filter medium does not have a bead or other tracking means formed on either of its edges. As shown in FIGS. 1 and 2, a single one of the aligning and dewrinkling devices generally includes a pair of freely rotatable first and second cylindrical rollers 15 and 17 which are mounted parallel to the ends of first and second arm members 19 and 21, respectively, so that a long nip line 23 is defined between the rollers. For convenience in the following discussion, the ends of the arm members 19 and 21 to which the cylindrical rollers are attached will be referred to as the working ends; the opposite ends of the arm members will be called the worked ends.

Still speaking generally, the first arm member 19 is fixedly connected to a mounting member such as threaded rod 25, by means of which the aligning and dewrinkling device is rigidly affixed to a filtration machine adjacent an edge of the filter medium belt which travels across a drainage surface on the filtration machine. The second arm member 21 is pivotably connected, intermediate its ends, to the first arm member 19 for rocking movement relative thereto. In the illustrated embodiment, the pivotable connection, or fulcrum, is provided by a pivot pin 27 which extends through one end of a rigid linkage member 29; the opposite end of the linkage member 29 is fixed to the first arm member 19. The illustrated linkage member 29 is, in fact, an extension of the mounting rod 25 so that, in effect, the cylindrical rollers pivot about their mounted ends. Speaking even more particularly about the illustrated embodiment, the distal end of the linkage member 29 is positioned in a slot 31 (FIG. 2) formed in the second arm member 21 and the arm member 21 is free to rock back and forth in the slot about the pivot pin 27.

In the preferred embodiment, a biasing means, illustrated as a helical compression spring 35, is connected between the worked ends of the first and second arm members 19 and 21 to press the worked ends of the arm members apart in order to pinch the rollers 15 and 17 together with a predetermined force. The ends of the arm members to which the spring 35 is affixed are pressed apart by the spring and, hence, the designation "worked ends." In the illustrated embodiment, the helical spring 35 is held in position by locating bolts 37 and 38. The biasing pressure, of course, depends upon the selected spring constant. It should be appreciated that the compression spring 35 could be replaced by a tension spring connected between the arm members at the opposite side of the fulcrum point, although such an embodiment is not preferred.

Each of the devices of the present invention further include a selectively actuatable pressure means, such as an hydraulic or pneumatic ram 41, mounted to force the worked ends of the arm members away from one another. In the particular illustrated embodiment, the ram 41 includes a cylinder 43 which is fixed to the worked end of the second arm member 21, a piston 45 which operates reciprocatively within the cylinder, and a piston rod 47 which extends slidably through the cylinder end wall to a pivotable connection with the worked end of the arm member 19 at a pivot pin 49. The cylinder 43 is charged with fluid via a line 51. Referring even more particularly to the illustrated embodiment, the distal end of the piston rod 47 is positioned in a slot 53 formed in the first arm member so that the piston rod can pivot within the slot about the pin 49. In operation, fluid is carried into the cylinder 43 under pressure and that in turn forces the piston 45 downward and extends the piston rod 47 to push or wedge the worked ends of the arm members 19 and 21 apart. The wedging force at the worked ends of the arm members 19 and 21 presses the working ends together and thereby increases the grip between the cylindrical rollers 15 and 17. In normal operation, the travel distance of the worked ends of the arm members is very slight and, for that reason, the illustrated connection of the ram 41 to the arm members 19 and 21 is acceptable; were the travel distance substantial, say more than ½ inch, the illustrated connection would bind and, hence, would not be acceptable in practice.

Referring now particularly to FIG. 2, the cylindrical roller 17 is secured to the working end of the arm member 21 by shaft 55 which, in the illustrated embodiment, extends from the working end of the arm member in a direction parallel to the longitudinal axis of the arm. The bearing shaft 55 fits rotatably through a bore 57 formed coaxially through the roller 17 and, hence, the roller 17 is freely rotatable on the bearing shaft 55 as indicated by the curved arrows in FIG. 1. The other cylindrical roller 15 is similarly mounted on a bearing shaft 59. Preferably, the bearing shafts include means to lubricate the bearing-roller interfaces; to that end, the illustrated bearing shaft 55 is depicted as a hollow tubular member which has an oil escape orifice 61 formed through its sidewall.

Figure 3:
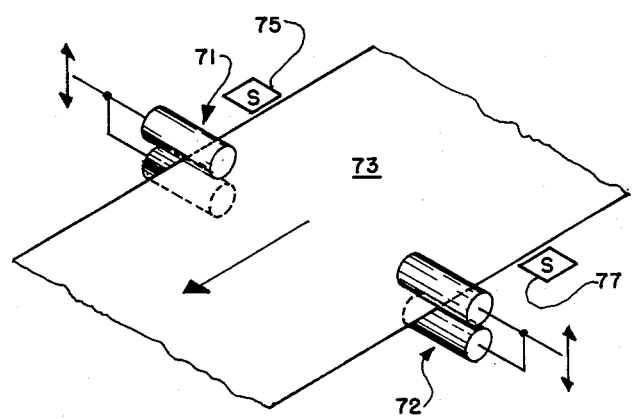
FIG. 3 is a schematic diagram which is offered to show the manner of cooperative operation of a pair of the devices of FIG. 1.
Figure 4:
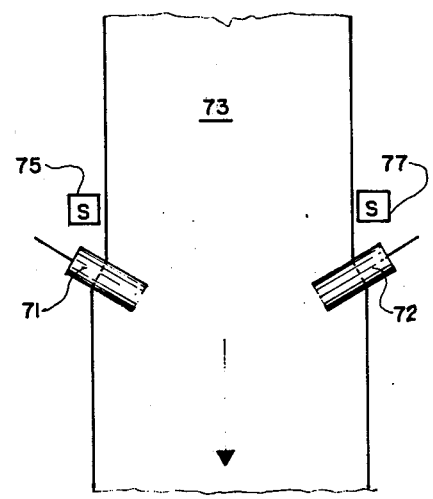
FIG. 4 is a schematic diagram which can be understood to be FIG. 2 viewed from above and exaggerated for purposes of illustration.

The operation of a pair of the aforedescribed aligning and dewrinkling devices in conjunction with a thin belt of filter medium will now be described with reference to FIGS. 3 and 4 which schematically depict two of the aforedescribed aligning and dewrinkling devices, designated 71 and 72, respectively, mounted adjacent opposite edges of a filter medium belt 73 trained to travel across a drainage surface where the belt of filter medium does not have a bead formed along either of its edges. More particularly, the roller pairs are mounted such that their longitudinal axes are at a cant or angle with respect to the direction of travel of the belt (FIG. 4). The edges of the filter belt are gripped between the associated rollers of the two pairs of aligning devices. It may be appreciated that the aligning and dewrinkling devices can be mounted in the orientation shown in FIG. 1 or in an inverted position.

In practice, the two aligning and dewrinkling devices 71 and 72 operate in response to sensor means 75 and 77 which are located adjacent opposite edges of the belt 73. The sensor means function to determine the location of the edges of the filter belt relative to the aligning and dewrinkling devices and can be understood to be conventional on-off mechanisms such as, for example, whisker-type sensors or air bleed orifices. For present purposes, a sensor should be considered to be "on" whenever it is in contact with the adjacent edge of the filter belt. Thus, for example, the sensor 77 is "on" so long as it contacts the adjacent edge of the belt 73 and is "off" when the belt has moved laterally towards the opposite aligning and dewrinkling device 71 and is out of contact with the sensor 77. The sensors can be mounted on the aligning and dewrinkling devices proper or can be mounted on the frame of the filtration machine adjacent the aligning and dewrinkling devices to sense the location of the edges of the filter belt either before or after it has passed through the aligning and dewrinkling devices.

When in the "on" condition (i.e., in contact with an adjacent edge of the filter belt), a sensor means actuates a valve or the like to permit the flow of pressurized fluid to the ram connected to the aligning and dewrinkling device at the opposite edge of the filter medium belt. For example, the ram mounted on aligning and dewrinkling device 71 will be pressurized when the sensor 77 is "on." Then, when the belt moves away from the sensor 77 (i.e. towards aligning device 71 and sensor 75), the ram will be depressurized.

Whenever the ram of one of the aligning and dewrinkling devices is charged with pressurized fluid, the pair of cylindrical rollers associated with that device will be pressed together and, as a result, the filter belt traveling between the cylindrical rollers will be forced to travel in a direction normal to the axis of rotation of the rollers. As shown in FIG. 4, this action of the cylindrical rollers results in spreading the belt and thus provides the dewrinkling function. It should be appreciated that, in practice, filter belts have a tendency to slip lengthwise of the nip between the rollers and, therefore, the spreading or dewrinkling action is most effective when a pair of rollers is pressed forcibly together by the ram associated therewith. On the other hand, it should be appreciated that belt slippage between a pair of cylindrical rollers which are not forced together is desirable because such slippage allows the filter belt to be aligned by the aligning and dewrinkling device on the opposite side of the belt.

With respect to the relationship between the sensor means and the aligning and dewrinkling devices, it should be understood that the aforedescribed mode of operation can be reversed or modified in other ways. In the reverse mode of operation, the sensor means 75 and 77 would be connected to actuate the flow of pressurized fluid to the ram connected to the aligning and dewrinkling device at the same edge, not the opposite edge, of the belt of filter medium. In normal operation in this reverse mode, the rams associated with the two aligning and dewrinkling devices would be pressurized to provide the spreading or dewrinkling function; then when the filter medium belt moved off center and contacted one of the sensor means, the ram associated with the aligning and dewrinkling device at that edge of the belt would be depressurized. Then, because the gripping pressure would be relatively greater at the opposite edge of the belt, the belt would tend to move toward the opposite edge.

I claim

1. In combination with a filtration machine having an endless belt of thin filter medium trained to travel across a drainage surface, which belt of filter medium does not have a bead on either of its edges, a pair of devices for aligning and dewrinkling the belt of filter medium across the drainage surface, each of said aligning and dewrinkling devices of said pair comprising:
  a. mounting means which affix the aligning and dewrinkling device rigidly to the filtration machine adjacent an edge of the traveling endless belt of filter medium;
  b. a first arm member rigidly connected to said mounting means;
  c. a first cylindrical roller and means affixing the same to said first arm member for rotation about the central axis of said first cylindrical roller, said first cylindrical roller being mounted to said first arm member to extend beneath the adjacent edge of the belt of filter medium in a direction generally parallel to the plane of the belt of filter medium;
  d. a second arm member and pivot means which connects said second arm member to said first arm member for rocking movement;
  e. a second cylindrical roller and means affixing the same to said second arm member for rotation about the central axis of said second cylindrical roller, said second cylindrical roller being mounted to said second arm member to extend above the adjacent edge of the belt of filter medium in a direction generally parallel to the plane of the belt of filter medium to define a long nip line with said first cylindrical roller along which the filter medium is gripped;
  f. biasing means connected between the ends of said first and second arm members opposite the ends to which said first and second cylindrical rollers are affixed to urge said opposite ends away from one another and, hence, to urge said second arm member to rock so as to pinch said first and second cylindrical rollers together; and
  g. selectively actuatable pressure means mounted between the ends of said first and second arm members opposite the ends to which said first and second cylindrical rollers are affixed for selectively forcing said opposite ends away from one another.

2. The invention according to claim 1 wherein, for each of said aligning and dewrinkling devices, said first and second cylindrical rollers are mounted so their central axes extend at an angle to the direction of travel of the belt of filter medium.

3. The invention according to claim 2 further including two sensor means, each of which is stationarily mounted to determine the location of the edges of the filter medium belt relative to a respective one of said aligning and dewrinkling devices and valve means connected to and operable by said sensor means to actuate one of said selectively actuatable pressure means associated with said aligning and dewrinkling devices.

4. The invention according to claim 1 wherein said selectively actuatable pressure means comprises a piston and cylinder assembly and said cylinder is fixedly connected to said second arm member and the rod of said piston is pivotably connected to said first arm member.

5. The invention according to claim 4 wherein said pivot means which connects said second arm member to said first arm member comprises a rigid linkage member fixed at one of its ends to said first arm member and a pivot pin which connects the other end of said linkage member to said second member at a fulcrum point which is above said first arm member.

6. The invention according to claim 4 wherein said valve means connected to and operable by said sensor means is connected to actuate said selectively actuatable pressure means associated with the said aligning and dewrinkling device mounted on the opposite edge of the belt of filter medium.

7. The invention according to claim 4 wherein said valve means connected to and operable by said sensor means is connected to actuate said selectively actuatable pressure means associated with the said aligning and dewrinkling device mounted along the same edge of the belt of filter medium.

8. A device for aligning and dewrinkling an endless belt of thin filter medium trained to travel across a drainage surface of filtration machine, which belt of filter medium does not have a bead on either of its edges, comprising:
  a. mounting means which affix the aligning and dewrinkling device rigidly to a filtration machine adjacent an edge of the traveling endless belt of filter medium;
  b. a first arm member rigidly connected to said mounting means;
  c. a first cylindrical roller and means affixing the same to said first arm member for rotation about the central axis of said first cylindrical roller;
  d. a second arm member and pivot means connecting said second arm member to said first arm member for rocking movement relative to said first arm member;
  e. a second cylindrical roller and means affixing the same to said second arm member for rotation about the central axis of said second cylindrical roller, said second cylindrical roller being mounted to said second arm member to extend above the adjacent edge of the belt of filter medium in a direction generally parallel to the plane of the belt of filter medium to define a long nip line with said first cylindrical roller along which the filter medium is gripped;
  f. biasing means connected between the ends of said first and second arm members opposite the ends to which said first and second cylindrical rollers are affixed to urge said opposite ends away from one another and, hence, to pinch said first and second cylindrical rollers together; and
  g. selectively actuatable pressure means mounted between the ends of said first and second arm members opposite the ends to which said first and second cylindrical rollers are affixed for selectively forcing said opposite ends away from one another.

9. In combination with a filtration machine having an endless belt of thin filter medium trained to travel across a drainage surface, which belt of filter medium does not have a bead on either of its edges, a pair of devices for aligning and dewrinkling the belt of filter medium across the drainage surface, each of said aligning and dewrinkling devices of said pair comprising:
  a. mounting means which affix the aligning and dewrinkling device rigidly to the filtration machine adjacent an edge of the traveling endless belt of filter medium;
  b. a first arm member rigidly connected to said mounting means;
  c. a first cylindrical roller and means affixing the same to said first arm member for rotation about the central axis of said first cylindrical roller, said first cylindrical roller being mounted to said first arm member to extend beneath the adjacent edge of the belt of filter medium in a direction generally parallel to the plane of the belt of filter medium;

d. a second arm member and pivot means which connects said second arm member to said first arm member for rocking movement;

e. a second cylindrical roller and means affixing the same to said second arm member for rotation about the central axis of said second cylindrical roller, said second cylindrical roller being mounted to said second arm member to extend above the adjacent edge of the belt of filter medium in a direction generally parallel to the plane of the belt of filter medium to define a long nip line with said first cylindrical roller along which the filter medium is gripped; and f. selectively actuatable pressure means mounted between the ends of said first and second arm members opposite the ends to which said first and second cylindrical rollers are affixed for selectively forcing said opposite ends away from one another and, hence, to urge said second arm member to rock so as to pinch said first and second cylindrical rollers together.

10. A method for aligning and dewrinkling an endless belt of filter medium trained to travel across a drainage surface, which belt of filter medium does not have a bead formed on either of its edges, comprising the following steps:

a. on each side of the belt of filter medium, gripping the belt from above and below with two generally parallel cylindrical rollers where the longitudinal axes of the rollers are at an angle with respect to the direction of travel of the belt and where the cylindrical rollers are connected for rotation to first and second arm members, respectively, which are connected at a fulcrum point for rocking movement one toward the other;

b. sensing the lateral position of the belt of filter medium with two sensors fixed adjacent the two opposite edges of the belt; and c. forcing the two arm members to pivot to force the rollers toward one another to grip the belt of filter medium according to the lateral position of the filter medium belt determined by said sensor means.

11. The method according to claim 10 wherein the associated cylindrical rollers are normally pressed together with a first predetermined force exerted by a selectively actuatable pressure means and, when the filter belt moves out of contact with one of said sensors, the pressure means associated with the pair of rollers at the opposite edge of the belt is actuated to relieve the first predetermined force.

* * * * *

Disclaimer 4,072,611.—*Steven S. Davis*, Bountiful, Utah. BELT DEWRINKLING AND ALIGNMENT METHOD AND APPARATUS. Patent dated Feb. 7, 1978. Disclaimer filed Apr. 28, 1980, by the assignee, *Envirotech Corporation*.

Hereby enters this disclaimer to claim 9 of said patent.

[*Official Gazette July 22, 1980.*]